United States Patent
Choi

(10) Patent No.: US 8,532,471 B2
(45) Date of Patent: Sep. 10, 2013

(54) MOBILE COMMUNICATIONS TERMINAL FOR RESERVATION RECORDING AND METHOD THEREOF

(75) Inventor: Bo-Hui Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1290 days.

(21) Appl. No.: 11/493,649

(22) Filed: Jul. 27, 2006

(65) Prior Publication Data

US 2007/0025692 A1    Feb. 1, 2007

(30) Foreign Application Priority Data

Jul. 27, 2005 (KR) .................. 10-2005-0068662

(51) Int. Cl.
*H04N 5/76* (2006.01)
(52) U.S. Cl.
USPC .......................................... 386/291; 386/297
(58) Field of Classification Search
USPC ................... 386/46, 83, 95, 291–299
See application file for complete search history.

(56) References Cited

U.S. PATENT DOCUMENTS

| | | | |
|---|---|---|---|
| 7,003,213 B1* | 2/2006 | Hasegawa | 386/291 |
| 7,123,813 B2* | 10/2006 | Inoue | 386/46 |
| 7,496,275 B2* | 2/2009 | Cooper et al. | 386/83 |
| 2003/0093783 A1* | 5/2003 | Nelson | 725/9 |
| 2004/0210932 A1 | 10/2004 | Mori et al. | |
| 2005/0213938 A1* | 9/2005 | Ozawa et al. | 386/83 |

FOREIGN PATENT DOCUMENTS

| | | |
|---|---|---|
| JP | 2000-270280 A | 9/2000 |
| JP | 2003-333481 A | 11/2003 |
| WO | WO 2005/094073 A1 * | 6/2005 |

* cited by examiner

*Primary Examiner* — Hung Dang
(74) *Attorney, Agent, or Firm* — Birch, Stewart, Kolasch & Birch, LLP

(57) ABSTRACT

A mobile communications terminal and method for reservation-recording a particular broadcast program or content, are provided. The method according to an embodiment includes temporarily reserving a recording of a particular broadcast program or content into a temporary list, reserving a recording of the particular broadcast program or content into a reservation list based on the temporary list, and recording the particular broadcast program or content based on the reservation list.

12 Claims, 4 Drawing Sheets

| TEMPORARY RECORDING RESERVATION LIST ||||| 
|---|---|---|---|---|
| BROADCAST CHANNEL | TITLE | AUTHOR | BROADCAST STARTING TIME | BROADCAST AIRTIME |
| CH32 | ? | BEATLES | ? | ? |
| CH55 | DIZZY | ? | 14:35:00 | ? |
| CH59 | CHAMPION | ? | ? | ? |

| NORMAL RECORDING RESERVATION LIST ||||| 
|---|---|---|---|---|
| BROADCAST CHANNEL | TITLE | AUTHOR | BROADCAST STARTING TIME | BROADCAST AIRTIME |
| CH32 | LET IT BE | BEATLES | 14:00:00 | 2'11" |
| CH55 | DIZZY | TOMMY ROE | 14:35:00 | 4'30" |
| CH59 | CHAMPION | PSY | 14:35:10 | 2'30" |

FIG. 3

| CURRENT CONTENTS | | | | | | NEXT CONTENTS | | | |
|---|---|---|---|---|---|---|---|---|---|
| BROADCAST CHANNEL | TITLE | AUTHOR | BROADCAST STARTING TIME | BROADCAST AIRTIME | RESERVED | TITLE | AUTHOR | BROADCAST STARTING TIME | BROADCAST AIRTIME |
| CH32 | LET IT BE | BEATLES | 14:40:00 | 2'11" | | LIFE IS COOL | SWEET BOX | 14:42:11 | 2'11" |
| CH55 | DIZZY | TOMMY ROE | 14:35:00 | 4'30" | | GO | SWEET BOX | 14:42:11 | 4'00" |
| CH59 | ANGEL | SARAH MCLACHLAN | 14:27:00 | 3'28" | | CHAMPION | PSY | 14:35:10 | 2'30" |

| TEMPORARY RECORDING RESERVATION LIST | | | | |
|---|---|---|---|---|
| BROADCAST CHANNEL | TITLE | AUTHOR | BROADCAST STARTING TIME | BROADCAST AIRTIME |
| CH32 | ? | BEATLES | ? | ? |
| CH55 | DIZZY | ? | 14:35:00 | ? |
| CH59 | CHAMPION | ? | ? | ? |

⇩

| NORMAL RECORDING RESERVATION LIST | | | | |
|---|---|---|---|---|
| BROADCAST CHANNEL | TITLE | AUTHOR | BROADCAST STARTING TIME | BROADCAST AIRTIME |
| CH32 | LET IT BE | BEATLES | 14:00:00 | 2'11" |
| CH55 | DIZZY | TOMMY ROE | 14:35:00 | 4'30" |
| CH59 | CHAMPION | PSY | 14:35:10 | 2'30" |

MOBILE COMMUNICATIONS TERMINAL FOR RESERVATION RECORDING AND METHOD THEREOF

RELATED APPLICATION

The present application claims priority to, and relates to a subject matter contained in Korean Patent Application No. 10-2005-0068662, filed on Jul. 27, 2005, in Korea, which is herein expressly incorporated by reference in its entirety.

BACKGROUND OF THE INVENTION

1. Field of the Invention

The present invention relates to a mobile communications terminal, and particularly, to a mobile communications terminal capable of reservation-recording a certain broadcast program or content, and a method thereof.

2. Discussion of the Background Art

In general, an Electronic Program Guide (EPG) denotes a broadcast program listing transmitted by a data broadcast which uses empty frequency bands or spare channels.

EPG operators classify preview programs or program related information received from several Program Providers (PP) according to themes, time, and characteristics of viewers, and accordingly provide viewers with EPG information in real time.

The EPG information can thusly be used to allow broadcast program viewers to confirm time or channels that their desired programs are to be broadcast within an EPG information provision period as well as on that day. Also, the broadcast program viewers can get more detailed program related information (e.g., information related to players, information related to outlines to be broadcast, etc.) than broadcasting program listings by designating desired programs.

Therefore, when searching for the EPG information, if there is a broadcast program which a broadcast program viewer wants to record, the viewer may manipulate a recording apparatus and reserve a recording for the broadcast program. Accordingly, when the broadcast program is broadcast, the recording apparatus automatically records the reserved broadcast program.

However, the related art reservation-recording method can perform the reservation-recording only for broadcast programs that the EPG provider provides within the EPG information provision period. That is, information related to programs which are broadcast after the EPG information provision period can not be known previously, and thus, such programs can not be reservation-recorded.

SUMMARY OF THE INVENTION

Therefore, an object of the present invention is to provide a mobile communications terminal for reservation-recording a broadcast program or content for which channel organization information is not yet provided, and a method thereof.

Another object of the present invention is to provide a mobile communications terminal for reservation-recording a particular broadcast program or content by using only partial information on the particular broadcast program or content, and a method thereof.

To achieve these and other advantages and in accordance with the purpose of the present invention, as embodied and broadly described herein, there is provided according to an embodiment a mobile communications terminal for reservation-recording a particular broadcast program or content, comprising: a controller for recording a reserved broadcast program or content based upon recording reservation information with respect to the broadcast program or content; a broadcast receiver for receiving the reserved broadcast program or content by selecting a designated broadcast channel under control of the controller; and a radio communication unit for accessing a service which provides channel organization information and downloading the channel organization information from the service under the control of the controller.

According to an embodiment, the present invention provides a reservation-recording method of a mobile communications terminal, the method comprising: temporarily reserving a recording of a particular broadcast program or content into a temporary list; reserving a recording of the particular broadcast program or content into a reservation list based on the temporary list; and recording the particular broadcast program or content based on the reservation list.

According to another embodiment, the present invention provides a reservation-recording method of a mobile communications terminal, the method comprising: checking and retrieving broadcast information related to a particular broadcast program or content provided through channel organization information in view of a temporary reservation list; registering the retrieved broadcast information in a recording reservation list; and recording the reserved broadcast program or content based upon the broadcast information registered in the recording reservation list.

According to another embodiment, the present invention provides a reservation-recording method of a mobile communications terminal, the method comprising: registering information related to a particular broadcast program or content provided from channel organization information, in a recording reservation list; if information of the particular broadcast program or content, which is required to be registered in the recording reservation list, has partially been registered, retrieving other information of the particular broadcast program or content, which has not been registered in the recording reservation list, from the channel organization information; updating the recording reservation list based upon the other information retrieved from the channel organization information; and recording the particular broadcast program or content based upon the updated information included in the recording reservation list.

According to another embodiment, the present invention provides a mobile communications terminal for reservation-recording, the terminal comprising: a memory to store a temporary list and a reservation list; and a controller to temporarily reserve a recording of a particular broadcast program or content into the temporary list, to reserve a recording of the particular broadcast program or content into the reservation list based on the temporary list, and to record the particular broadcast program or content based on the reservation list.

According to another embodiment, the present invention provides a mobile communications terminal for reservation-recording, the terminal comprising: a controller for recording a reserved particular broadcast program or content based upon recording reservation information related to the broadcast program or content; a broadcast receiver for receiving the reserved broadcast program or content by selecting a set broadcast channel under control of the controller, and a radio communication unit for accessing a service which provides channel organization information under the control of the controller, and downloading the channel organization information from the service.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 shows an example of a table showing real-time channel organization information in an embodiment for a content recording in accordance with the present invention;

DETAILED DESCRIPTION OF THE PREFERRED EMBODIMENTS

Description will now be given in detail of the preferred embodiments of the present invention, with reference to the accompanying drawings.

The present invention provides a mobile communications terminal such that a reservation-recording can normally be performed with respect to a broadcast program which is not provided through current channel organization information (e.g., EPG schedule or EPG Present/Follow (P/F)) or a content of the broadcast program by using only partial information related to the program or content, and provides a method thereof.

In addition, the present invention provides a mobile communications terminal such that when desiring to reserve a recording of a broadcast program or content which is not provided through current channel organization information, the broadcast program or content is first registered in a temporary recording reservation list, and the channel organization information is periodically automatically retrieved whenever it is updated, wherein when the channel organization information then provides information related to the broadcast program or content, the retrieved information is used to register the temporary recording reservation list into a normal recording reservation list, so as to enable the reserved recording to be normally performed.

Hereinafter, preferred embodiments of the present invention will be explained in detail with reference to the accompanying drawings.

Figure 1:
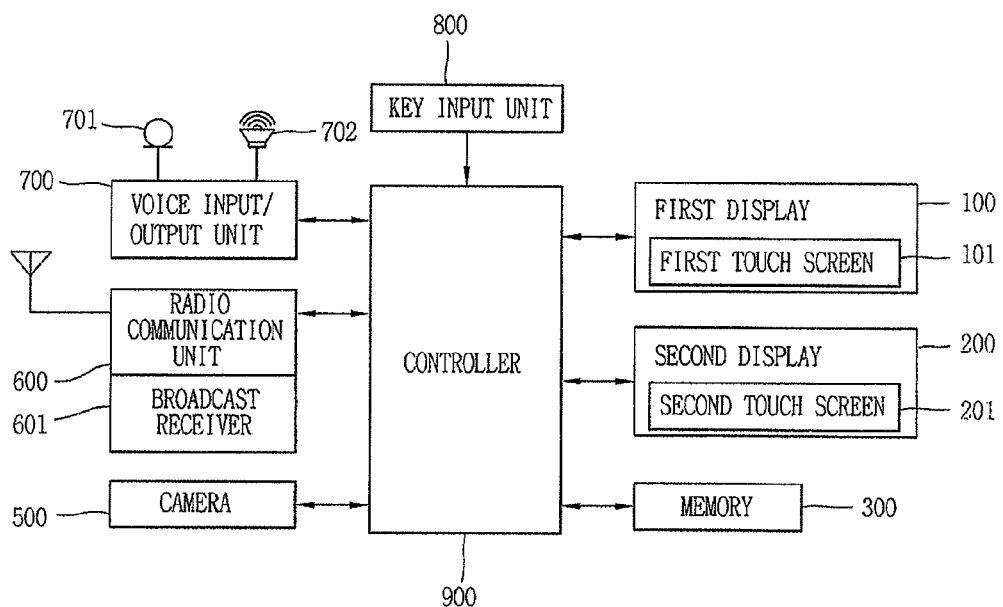
FIG. 1 is a block diagram illustrating a configuration of a mobile communications terminal for reservation-recording a broadcast program in accordance with the present invention.

FIG. 1 is a block diagram illustrating a configuration of a mobile communications terminal for reservation-recording a broadcast program in accordance with an embodiment of the present invention.

As illustrated in FIG. 1, a voice input/output unit 700 receives voice through a microphone 701, whereas it outputs voice through a speaker 702.

A radio (wireless) communication unit 600 converts a voice (audio) signal received from the voice input/output unit 700 into a radio signal and outputs the radio signal through an antenna, or extracts an audio signal from a radio signal received through the antenna and outputs the extracted audio signal to the voice input/output unit 700.

The radio communication unit 600 may transmit/receive a data signal in addition to the audio signal. For example, the data signal may be used to support a wireless internet and transmission of various types of files. Furthermore, the radio communication unit 600 may separately be provided with a broadcast receiver 601 for receiving a terrestrial broadcasting or satellite broadcasting.

A camera 500 captures images under control of a controller 900.

A memory 300 stores various types of data and programs required for controlling the terminal, and the images captured by the camera 500. Also, the memory 300 stores Electronic Program Guide (EPG) data or recording data received from the radio communication unit 600 or the broadcast receiver 601.

In addition, the mobile communications terminal according to the present invention may comprise a plurality of displays (e.g., a first display 100 and a second display 200) for simultaneously performing an input function and a display function.

The displays 100 and 200 may be separated from each other or integrated with each other. That is, two separate displays may be provided, or one display may be divided into two or more regions for use.

One (or both) of the displays 100 and 200 is provided with a touch screen unit (e.g., a first touch screen 101, a second touch screen 201), to thusly perform an input function. The input function may include a key (or button) based input function or a drag based input function.

The displays 100 and 200 display EPG data and/or broadcasts received from the radio communication unit 600 or the broadcast receiver 601, to thusly allow the viewing of the Internet or broadcasts.

Furthermore, the mobile communications terminal according to the present invention may comprise a key input unit 800 for detecting an input made by a hot key (not shown) or a jog dial key (not shown) which is provided to directly perform a preset function, or by other types of keys and buttons.

The controller 900 controls the plurality of displays 100 and 200 to display various information related to communication and broadcast programs. The controller 900 also controls each function block to detect an input of a certain key or button and to perform a function set to the input key or button.

For example, when detecting an input of a key related to recording for broadcast programs, the controller 900 controls the displays 100 and 200 to display a menu for setting a recording. The menu is then selected, e.g., by a user, to thusly perform the recording.

Here, the menu is displayed on one of the plurality of displays 100 and 200, and the key input may be implemented by entering a key or button or touching a touch screen by a user.

The present invention can characteristically receive channel organization information (e.g., EPG schedule or EPG P/F) through the radio communication unit 600. When a user reserves a recording for a broadcast program using partial information related to the broadcast program, the controller 900 retrieves the channel organization information including information related to the broadcast program, and finds exact broadcast information (e.g., broadcast channel, broadcast airtime, etc.) with respect to the broadcast program to accordingly record the broadcast program. The recorded broadcast program is stored in the memory 300.

Hereinafter, an operation of the mobile communications terminal having such configuration will now be explained in detail according to the present invention.

Figure 2:
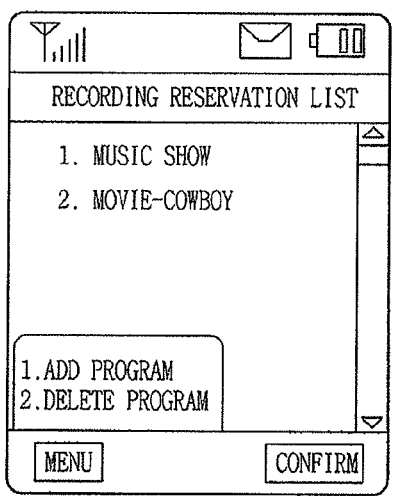
FIG. 2 is an exemplary view illustrating a method for reservation-recording a broadcast program using a mobile communications terminal in accordance with the present invention.

FIG. 2 is an exemplary view illustrating a method for reservation-recording a broadcast program using a mobile communications terminal in accordance with an embodiment of the present invention.

In general, a user displays channel organization information (e.g., EPG schedule) (not shown) to retrieve his desired broadcast program. A menu for retrieving the programs provided through the channel organization information may contain items for retrieving programs based upon 'program title', 'date', 'time', and 'theme'.

When a broadcast program the user desires is included in the channel organization information, the user selects and displays a menu to set the recording. The menu selection is implemented in a manner of inputting a certain key or in a touching manner.

The menu for setting the recording may include items of 'add program' (or the like) and 'delete program' (or the like), which are respectively related to items for registering a desired program in 'a normal recording reservation list' and deleting a program registered in the 'normal recording reservation list'.

Accordingly, the user selects the item of 'add program' from the recording setting menu, and then registers the information related to the program retrieved from the channel organization information in the 'normal recording reservation list'. The information registered in the 'normal reservation-recording list' may include information related to a program to be recorded such as 'title', 'broadcast channel', 'broadcast starting time' and 'broadcast airtime'.

The 'normal reservation-recording list' in which the information regarding the program is provided, is stored in the memory 300.

According to the 'normal reservation-recording list' of the broadcast program(s) stored in the memory 300, the controller 900 controls the broadcast receiver 601 to receive a program to be broadcast on the 'broadcast channel' at the 'broadcast starting time', and then records the program for the 'broadcast airtime'.

However, if there is a broadcast program which is not provided through the channel organization information (e.g., EPG schedule), the mobile communications terminal of the present invention may have a characteristic that only partial information related to the broadcast program that a user has known is used to register the broadcast program in a 'temporary recording reservation list'.

In addition, in the mobile communications terminal of the present invention, even if a broadcast program is provided through the channel organization information, in case of reserving the recording for the program by using only partial information related to the program, the partial information regarding the broadcast program is registered in the 'temporary recording reservation list'.

Hereinafter, a function of registering the partial information of the program in the 'temporary recording reservation list' is defined as a "temporary recording reservation registration' function.

In the present invention, the "temporary recording reservation registration' function is implemented so that the partial information regarding the program is used to thereafter find the entire information thereof which matches the partial information regarding the program from channel organization information updated, to automatically register the entire information related to the program in the 'normal recording reservation list'.

The 'normal recording reservation list' denotes a recording reservation list which contains information necessarily required for recording a broadcast program, which is defined in order to distinguish it from the 'temporary recording reservation list'.

The mobile communications terminal of the present invention accesses a particular service which periodically provides the channel organization information, and periodically automatically retrieves the channel organization information until a broadcast program registered in the 'temporary recording reservation list' is registered into the 'normal recording reservation list'. If necessary, the mobile communications terminal may retrieve the channel organization information by directly downloading it.

FIG. 3 shows an example of a table showing real-time channel organization information in an embodiment for a content recording in accordance with the present invention.

The EPG P/F (Present/Follow) denotes an information field used for a user interface among Event Information Table (EIT) information. In the present invention, the EPG P/F is used in providing time-based sequence information with respect to contents of a broadcast program which is currently being broadcast on a particular channel.

The EPG P/F may include detailed information related to the contents within the broadcast program. For example, as shown in FIG. 3, if the broadcast program is a music show program, the EPG P/F may include the entire information related to a broadcast channel, title of a song, singer (author), broadcast starting time, broadcast airtime, and the like.

Consequently, the present invention can selectively record a specific content within a specific program as well as the specific program.

A method for recording the content will be explained with reference to FIG. 4 hereafter according to the present invention.

Figures 4, 5:
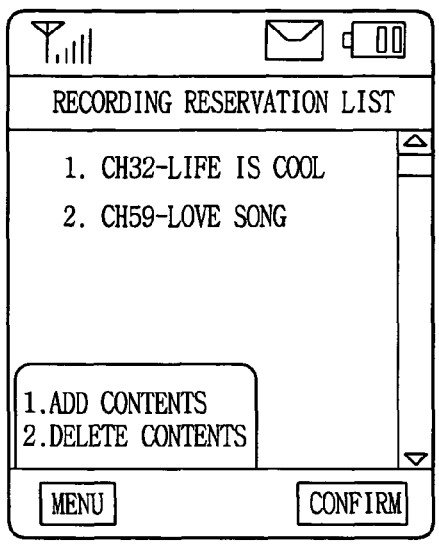
FIG. 4 is an exemplary view illustrating a method for reservation-recording a content using a mobile communications terminal in accordance with the present invention.
FIG. 5 shows an example of tables for comparing a 'temporary recording reservation list' with a 'normal recording reservation list' in accordance with the present invention.

FIG. 4 is an exemplary view illustrating a method for reservation-recording a content using a mobile communications terminal in accordance with the present invention.

As illustrated in FIG. 4, the user retrieves his desired content from channel organization information (e.g., EPG P/F) to find information required for reserving the recording of his desired content.

If the channel organization information (e.g., EPG P/F) provides the content the user desires, the user selects a menu for setting a recording to register his desired content in the 'normal recording reservation list'.

The menu for setting the content recording may include an item of 'add content' and an item of 'delete content'. That is, the items of the menu may be used to register a desired content in the 'normal recording reservation list', or to delete a content previously registered in the 'normal recording reservation list'.

For example, the user selects the item of 'add content' from the recording setting menu, and thereafter can register the 'content related information' retrieved from the channel organization information (e.g., EPG P/F) in the 'normal recording reservation list'.

The 'content related information' may include information related to the content to be recorded such as 'name', 'broadcast channel', 'broadcast starting time', 'broadcast airtime', 'author', and the like.

For example, for a content related to music, the 'name' of the content corresponds to a 'title of a song', and the 'author' may correspond to 'singer', 'composer', 'writer', 'master of program', 'participant of program', or the like according to the characteristic of the broadcast program.

The 'normal recording reservation list' in which various information regarding the content is provided, is stored in the memory 300.

According to the 'normal recording reservation list' of the content stored in the memory 300, the controller 900 controls the broadcast receiver 601 to receive the content which is broadcast on the 'broadcast channel' at the 'broadcast starting time', and records the content for the 'broadcast airtime' accordingly.

However, if a content is not provided through the channel organization information (e.g., EPG P/F), the mobile communications terminal according to the present invention can characteristically use partial information related to the content, the information that the user has known, to thereby register the content in the 'temporary recording reservation list'.

In addition, even in case where the recording is reserved with respect to a content only using partial information thereof although the content is provided through the channel organization information, the mobile communications terminal can register the partial information regarding the content in the 'temporary recording reservation list'.

The mobile communications terminal of the present invention uses information related to the content registered in the 'temporary recording reservation list' to thereafter find the entire or complete information regarding the content which matches the partial information regarding the content, from the channel organization information (e.g., EPG P/F) as updated, and then automatically registers the located complete content in the 'normal recording reservation list'.

FIG. 5 shows an example of tables for comparing a 'temporary recording reservation list' with a 'normal recording reservation list' in accordance with an embodiment of the present invention.

In order to convert the 'temporary recording reservation list' into the normal recording reservation list', the mobile communications terminal accesses a particular service which periodically provides the channel organization information, or retrieves the channel organization information by directly downloading it. Once the mobile communications terminal obtains the complete information for the partial information in the 'temporary recording reservation list', it registers the obtained complete information into the 'normal recording reservation list'. As a variation, the 'temporary recording reservation list' and the 'normal recording reservation list' can be the same. In such a case, partial information on a certain program/content may be initially filled into the list. Then the terminal obtains any required additional information for the program/content from the channel organization information, and then fills or updates the list with the obtained additional information so that the reservation-recording can be achieved using the updated list.

Figure 6:
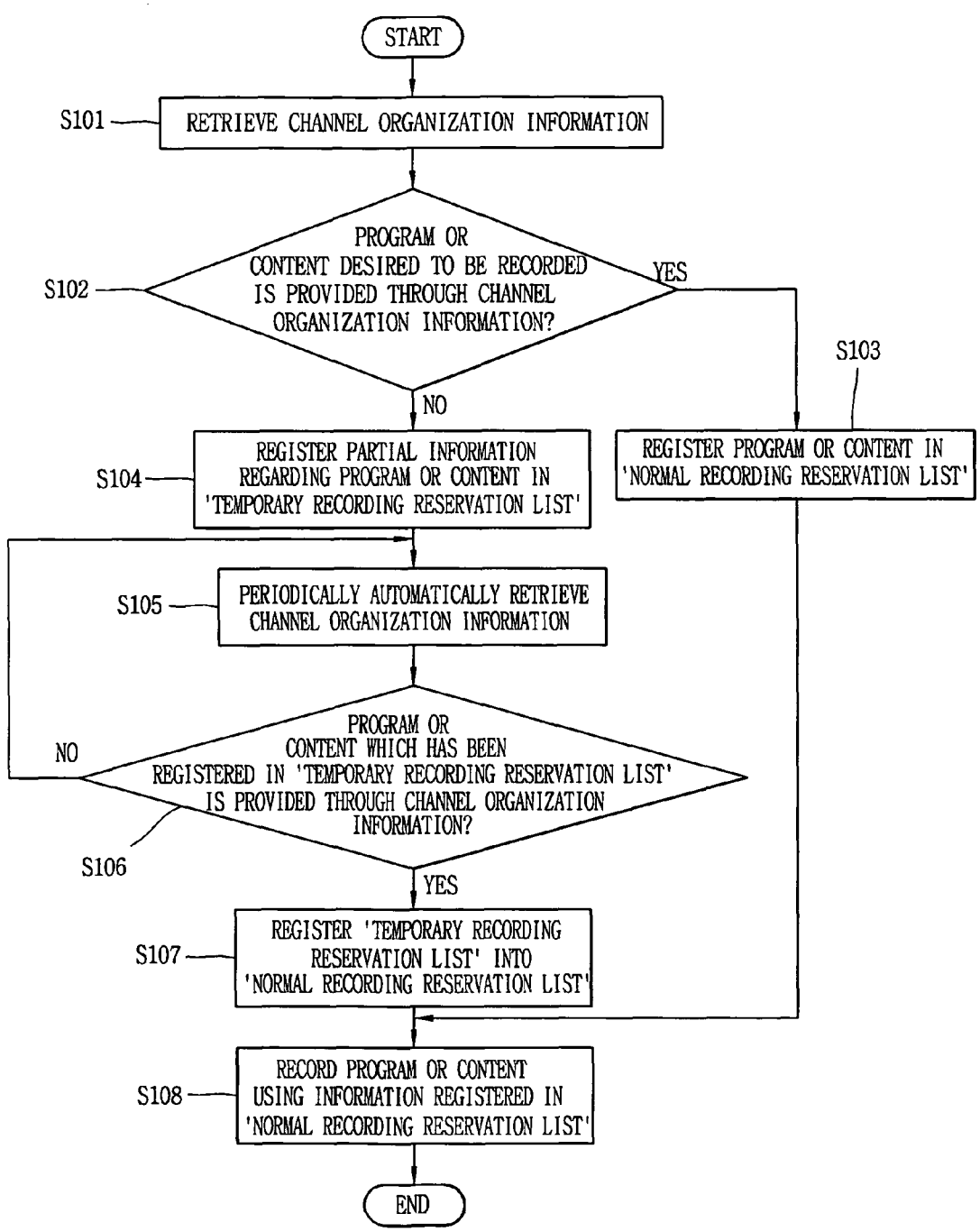
FIG. 6 is a flowchart illustrating a reservation-recording method using a mobile communications terminal in accordance with the present invention.

FIG. 6 is a flowchart illustrating a reservation-recording method using a mobile communications terminal in accordance with the present invention. The mobile communications terminal here can be the terminal of FIGS. 1-2 or can be other types of terminals.

As illustrated in FIG. 6, the user who desires to record a broadcast program first retrieves channel organization information (e.g., EPG schedule or EPG P/F) by manipulating a menu of his mobile communications terminal (S101).

The user then determines based upon the retrieved channel organization information whether a broadcast program or content that the user desires to record is provided in the channel organization information (S102).

If it is determined at step S102 that the channel organization information provides the broadcast program or content, the user reserves the recording for the desired broadcast program or content by selecting a menu for setting the recording in the mobile communications terminal. That is, the user registers the broadcast program or content related information in the 'normal recording reservation list' (S103).

Accordingly, the mobile communications terminal receives the broadcast program or content, which is broadcast on a 'broadcast channel' at a 'broadcast starting time' all of which are registered in the 'normal recording reservation list', and records the selected broadcast program or content accordingly for a 'broadcast airtime' which is also registered in the 'normal recording reservation list' (S108).

However, at step S102, if the desired broadcast program or content related information is not provided through the channel organization information, then the user registers the desired broadcast program or content (or information thereof) in the 'temporary recording reservation list' using partial information that the user has already known about the broadcast program or content (S104). That is, the user reserves the recording for the desired broadcast program or content by use of a 'temporary recording reservation registration' function provided in his mobile communications terminal. As an example, the user can supply the partial information about the desired broadcast program/content, e.g., from recalling advertisements or commercials that he user has seen or heard, etc.

The 'temporary recording reservation list' is then stored in the memory of the mobile communications terminal.

The channel organization information is periodically updated by service providers. Accordingly, the mobile communications terminal of the present invention periodically accesses a service which provides the channel organization information so as to periodically and automatically retrieve the channel organization information until the broadcast program or content registered in the 'temporary recording reservation list' is registered into the 'normal recording reservation list' (S105). That is, the mobile communications terminal periodically and automatically checks the incoming channel organization information for missing information on the broadcast program or content registered in the 'temporary recording reservation list', and once obtained, the broadcast program/content is registered in the 'normal recording reservation list' with all the required information for reservation recording since all the needed information is now available to the mobile communication terminal. An example of this process is depicted in FIG. 5.

According to the result of the automatic retrieval, if the channel organization information then provides the broadcast program or content registered in the temporary recording reservation list' (S106), the broadcast program or content registered in the 'temporary recording reservation list' is automatically registered in the 'normal reservation recording list' (S107). That is, the entire information required for the normal recording of that broadcast program/content is registered into the 'normal reservation recording list'. Once the broadcast program/content is registered into the 'normal reservation recording list', the same program/content can be removed from the 'temporary recording reservation list'.

Then, the mobile communications terminal receives the broadcast program or content which is broadcast on the 'broadcast channel' at the 'broadcast starting time' all of which are registered in the 'normal recording reservation list', and records the broadcast program or content for the 'broadcast airtime' registered in the 'normal recording reservation list' according to the information in the 'normal recording reservation list' (S108).

As described above, the present invention can effectively improve a user's convenience by reservation-recording a broadcast program of which channel organization information is not provided.

In addition, the present invention can effectively improve the user's convenience by reservation-recording a particular broadcast program or content by using only partial information related to the broadcast program or content.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A reservation-recording method of a mobile communications terminal, the method comprising:
    receiving via a receiving unit broadcast information including information related to broadcast content viewable on the mobile terminal;
    storing the received broadcast information in a memory of the mobile terminal;
    receiving via a key input unit a partial information among entire information related to a desired broadcast content to be recorded that is not included in the received broadcast information, the partial information including title, broadcast channel, broadcasting starting time and broadcast airtime;
    registering the received partial information in a temporary reservation list of the memory;
    receiving via the receiving unit new broadcast information related to the broadcast content to be viewable on the mobile terminal;
    storing the new broadcast information in the memory of the mobile terminal;
    searching the new broadcast information stored in the memory of the terminal and finding the entire information of the desired broadcast content which matches the partial information;
    updating the temporary reservation list in the memory to include remaining information needed to record the desired broadcast content based on the found entire information;
    registering the updated temporary reservation list as a normal reservation list to record the desired broadcast content when the updating of the temporary reservation list is completed;
    receiving via the receiving unit the broadcast content at a broadcast air time and on a broadcast channel identified in the normal reservation list; and
    recording the desired broadcast content at the broadcast air time and on the broadcast channel identified in the normal reservation list,
    wherein a table of the temporary reservation list is the same as a table of the normal reservation list,
    wherein the updating step updates the temporary reservation list to include the entire information needed to record the desired broadcast content, and
    wherein the temporary reservation list is deleted when the updating of the temporary reservation list is completed.

2. The method of claim 1, further comprising:
    displaying a reservation list menu on a display unit of the mobile terminal, said reservation list menu including at least an add option for adding a particular broadcast content identified in the received broadcast information, wherein the received broadcast information includes the entire information needed to record the added particular broadcast content.

3. The method of claim 1, wherein the normal reservation list is periodically updated with the temporary reservation list by service providers.

4. The method of claim 3, wherein the normal reservation list is periodically and automatically updated with the temporary reservation list by service providers without user interaction.

5. The method of claim 1, wherein the broadcast information related to the broadcast content comprises an Electronic Program Guide Present/Follow (EPG P/F) including time-based sequence information with respect to the broadcast contents.

6. The method of claim 1, wherein the broadcast information and the broadcast content are received via the wireless Internet.

7. A mobile terminal, comprising:
    a broadcasting receiving unit configured to receive broadcast information including information related to broadcast content viewable on the mobile terminal;
    a memory configured to store the received broadcast information;
    an input unit configured to receive a partial information of entire information related to a desired broadcast content to be recorded that is not included in the received broadcast information, wherein the memory is further configured to store a temporary reservation list including the partial information for the desired broadcast content to be recorded, the broadcasting receiving unit is further configured to receive new broadcast information related to the broadcast content to be viewable on the mobile terminal, and the memory is further configured to store the new broadcast information in the memory of the mobile terminal; and
    a control unit configured to search the new broadcast information stored in the memory, to find the entire information of the desired broadcast content which matches the partial information, to update the temporary reservation list in the memory to include remaining information needed to record the desired broadcast content based on the found entire information, to register the updated temporary reservation list as a normal reservation list, to record the desired broadcast content when the updating of the temporary reservation list is completed, and to record the desired broadcast content at the broadcast air time and on the broadcast channel identified in the normal reservation list,
    wherein a table of the temporary reservation list is the same as that of the normal reservation list,
    wherein the control unit updates the temporary reservation list to include the entire information needed to record the desired broadcast content, and
    wherein the control unit deletes the temporary reservation list when the updating of the temporary reservation list is completed.

8. The mobile terminal of claim 7, further comprising:
    a display unit configured to display a reservation list menu including at least an add option for adding a particular broadcast content identified in the received broadcast information, wherein the received broadcast information includes the entire information needed to record the added particular broadcast content.

9. The mobile terminal of claim 7, wherein the control unit is further configured to periodically update the normal reservation list with the temporary reservation list by service providers.

10. The mobile terminal of claim 9, wherein the control unit is further configured to periodically and automatically update the normal reservation list with the temporary reservation list by service providers without user interaction.

11. The mobile terminal of claim 7, wherein the broadcast information related to the broadcast content comprises an Electronic Program Guide Present/Follow (EPG P/F) including time-based sequence information with respect to the broadcast contents.

12. The mobile terminal of claim 7, wherein the broadcast information and the broadcast content are received via the wireless Internet.

* * * * *